(12) United States Patent
Okazaki et al.

(10) Patent No.: US 7,821,169 B2
(45) Date of Patent: Oct. 26, 2010

(54) AXIAL GAP TYPE MOTOR

(75) Inventors: Toru Okazaki, Osaka (JP); Shingo Ohashi, Osaka (JP); Hidehiko Sugitomo, Fukui (JP); Toshio Takeda, Tokyo (JP)

(73) Assignees: Sumitomo Electric Industries, Ltd., Osaka (JP); Ishikawajima-Harima Heavy Industries Co., Ltd., Tokyo (JP)

( * ) Notice: Subject to any disclaimer, the term of this patent is extended or adjusted under 35 U.S.C. 154(b) by 436 days.

(21) Appl. No.: 11/793,805

(22) PCT Filed: Dec. 16, 2005

(86) PCT No.: PCT/JP2005/023130

§ 371 (c)(1),
(2), (4) Date: Aug. 23, 2007

(87) PCT Pub. No.: WO2006/068042

PCT Pub. Date: Jun. 29, 2006

(65) Prior Publication Data

US 2008/0136282 A1    Jun. 12, 2008

(30) Foreign Application Priority Data

Dec. 24, 2004  (JP) .............................. 2004-374796

(51) Int. Cl.
  *H02K 21/24*   (2006.01)
  *H02K 1/18*    (2006.01)
  *H02K 55/02*   (2006.01)
(52) U.S. Cl. ................. 310/156.36; 310/52; 310/114; 505/166
(58) Field of Classification Search ............. 310/52, 310/114, 156.36; 505/166
  See application file for complete search history.

(56) References Cited

U.S. PATENT DOCUMENTS

| 4,001,617 | A | * | 1/1977 | Boyer ........................... 310/52 |
| 4,187,441 | A | * | 2/1980 | Oney ........................... 310/112 |
| 4,283,644 | A | * | 8/1981 | Kondo et al. .............. 310/68 R |
| 4,578,606 | A | * | 3/1986 | Welterlin ................... 310/68 R |
| 4,629,920 | A | * | 12/1986 | Hermann ................ 310/156.35 |
| 4,658,162 | A | * | 4/1987 | Koyama et al. ........... 310/68 R |
| 5,581,135 | A | * | 12/1996 | Ito et al. ........................ 310/52 |
| 5,619,087 | A |   | 4/1997 | Sakai |

(Continued)

FOREIGN PATENT DOCUMENTS

EP    0 643 471 B1    11/1997

(Continued)

*Primary Examiner*—Burton Mullins
(74) *Attorney, Agent, or Firm*—Foley & Lardner LLP

(57) ABSTRACT

A series coupling synchronous axial gap type motor where rotors and stators are alternately stacked with required air gaps in the axial direction of a rotary shaft as a main shaft, is provided. The rotors are fixed to the rotary shaft, and the stators are disposed such that they cannot be interlocked with the rotary shaft. A plurality of rotary field bodies are attached to each of the rotor around the axis, and a plurality of armature coils are made to face the rotary field bodies with an air gap therefrom and are attached to each of the stators around the axis such that their magnetic-flux directions are directed toward the axial direction. The armature coils have an empty core, or a core member composed of a magnetic body attached thereto.

13 Claims, 13 Drawing Sheets

U.S. PATENT DOCUMENTS

| | | | |
|---|---|---|---|
| 5,892,307 A * | 4/1999 | Pavlovich et al. | 310/68 B |
| 5,945,766 A * | 8/1999 | Kim et al. | 310/268 |
| 6,037,696 A | 3/2000 | Sromin et al. | |
| 6,407,466 B2 | 6/2002 | Caamano | |
| 6,720,688 B1 * | 4/2004 | Schiller | 310/64 |
| 7,598,647 B2 * | 10/2009 | Okazaki et al. | 310/171 |
| 2003/0052553 A1 * | 3/2003 | Isozaki et al. | 310/49 R |

FOREIGN PATENT DOCUMENTS

| | | | |
|---|---|---|---|
| JP | 57-177370 | | 11/1982 |
| JP | 3-289344 | | 12/1991 |
| JP | 7-87724 | | 3/1995 |
| JP | 8-242557 | | 9/1996 |
| JP | 9-327163 | | 12/1997 |
| JP | 10-248222 | | 9/1998 |
| JP | 2001-333562 | | 11/2001 |
| JP | 2004-140937 | | 5/2004 |
| WO | WO 2004/057738 | * | 7/2004 |

* cited by examiner

AXIAL GAP TYPE MOTOR

TECHNICAL FIELD

The present invention relates to an axial gap type motor, and specifically, to a series coupling synchronous high-output motor suitably used as driving sources of vehicles, ships, etc., particularly as motors for propulsion of large ships, such as government and public office ships or passenger ships.

RELATED ART

Conventionally, there are a radial gap type motor and an axial gap type motors as motors. As the radial gap type motor, a motor in which a rotor is provided in a hollow part of a stator having an annular cross-section such that the magnetic-flux directions of coils is directed to a radial direction is widely and generally used. Meanwhile, the axial gap type motor, as disclosed in Japanese Unexamined Patent Application Publication No. 2004-140937, is configured such that stators are disposed to face each other in the axial direction of a rotor, and the magnetic-flux directions of coils are directed to the axial direction.

In the conventional axial gap type motors, high output is required. Therefore, in a series coupling synchronous axial gap type motor in which rotors and stators are alternately disposed with required air gaps in an axial direction, it is difficult to provide a predetermined air gap between a rotor and a stator to arrange them with high precision, which becomes a bottleneck in manufacture.

That is, an armature coil which is provided so as to project from a stator towards a rotor is wound around and attached to an iron core, and the iron core projects from a tip of the armature coil. Therefore, if permanent magnets are disposed on the side of the rotor, the permanent magnets and the iron core will attract each other during assembling. As a result, it takes time and effort to provide a required air gap between the rotor and the stator. Further, an operator's finger has the danger of being caught in between the permanent magnets and the iron core.

As a result, it is necessary to increase the air gap between the stator and the rotor so that the tip of the iron core projecting from the armature coil and the tips of the permanent magnets may not interfere with each other, and close arrangement is not allowed. Therefore, high output will be hardly obtained, and the motor itself will be made large in the axial direction of the rotary shaft.

In particular, in the series coupling synchronous axial gap type motor in which rotors and stators are alternately disposed with required air gaps in an axial direction, it is necessary to alternately arrange the plurality of rotors and stators with large air gaps therebetween. Therefore, it is necessary to solve the above problems.

[Patent Document 1]
Unexamined Japanese Patent Application Publication No. 2004-140937

DISCLOSURE OF THE INVENTION

Problems to be Solved by the Invention

The invention is made in view of the above problem. It is therefore an object of the invention to provide a series coupling synchronous axial gap type motor which makes it possible to reduce the spacing between a stator and a rotor to miniaturize the motor and obtain high output, and to simply achieve assembling with a required small gap between the stator and the rotor.

Means for Solving the Problems

In order to solve the above problems, according to the invention, there is provided a series coupling synchronous axial gap type motor, including:
a rotary shaft as a main shaft, and
rotors and stators alternately stacked with required air gaps in the axial direction of the rotary shaft, wherein
the rotors are fixed to the rotary shaft,
the stators are disposed not to be interlocked with the rotary shaft,
a plurality of rotary field bodies are attached to each of the rotor around the axis,
a plurality of armature coils are made to face the rotary field bodies with an air gap therefrom and are attached to each of the stators around the axis such that their magnetic-flux directions are directed toward the axial direction, and
the armature coils have an empty core, or a core member composed of a magnetic body (hereinafter referred to as 'flux collector') attached thereto.

In the motor having the above configuration, a flux collector which generates a magnetic moment when a hollow part of armature coils is put in an empty core or magnetic field is used as a core member. Thus, even if the separating distance (air gap) between facing stator and rotor is made small, it is possible to suppress and prevent interfering during assembling. As a result, the armature coils and field bodies attached to the stators and rotors are disposed close to each other, so that high efficiency can be achieved, and miniaturization of the motor can be achieved.

In addition, in a case where armature coils are not wound around a flux collector, the armature coils are bonded and fixed to a stator, or pressed-fitted into a through-hole or concave part provided in a stator. Otherwise, armature coils are encapsulated within a container to be described, and then the container is detachably attached to a stator.

Preferably, magnetic field coils used as the armature coils and/or the rotary field bodies are formed from a superconductive material.

If the magnetic coils are formed from superconductive coils in this way, it is possible to apply a large current, and it is possible to reduce the size and weight of the motor while increasing output of the motor torque. A bismuth-based or yttrium-based high-temperature superconductive material is suitably used as the superconductive material. Also, if magnetic coils made of a superconductive material are used as the rotary field bodies in the case where stators and rotors are alternately with when small air gaps, even though a flux collector is attached to the magnetic coils, it is possible to prevent them from attracting each other, and it is possible to position and arrange them with excellent workability, and with small air gaps and high precision.

Further, the rotary field bodies may be formed from a high-temperature superconductive bulk magnet. Even if the high-temperature superconductive bulk magnet is used, a large magnetic field can be formed, and the output of the motor can be increased. This high-temperature superconductive bulk magnet is a magnet that is made of a high-temperature superconductive ingot obtained by dispersing a non-superconductive phase in an RE—Ba—Cu—O high-temperature superconductor to make the phase melt and grow, and that is capable of capturing and magnetizing a larger magnetic field than a high-performance permanent magnet.

Moreover, the rotary field bodies may be formed from permanent magnets. In this case, preferably, armature coils attached to the stators may have empty cores, or core members made of a magnetic substance are attached to the stators without projecting from the tips of the armature coils.

Preferably, the air gap between armature coils of a stator, and the rotary field bodies facing the armature coils is set to 0.1 mm to 1 mm.

As mentioned above, if the armature coils has an empty core or a core member composed of a flux collector, and superconductive coils rather than permanent magnets are used as the rotary field bodies, the gap between the armature coils and the rotary field bodies can be set to a small range as mentioned above, and a motor can be miniaturized.

The reason why the range of the gap distance is set to 0.1 mm to 1 mm is as follows. That is, if the gap distance is smaller than 0.1 mm, there is a possibility that, the field bodies and the armature coils may contact each other when any rotor deviates in position in the axial direction of the rotary shaft due to vibration, etc. Further, if the gap distance is larger than 1 mm, the spacing between a rotor and a stator becomes too large. As a result, magnetizing force is lowered, output is lowered, and a motor is made large in the axial direction.

Attachment of the armature coils to the stators may be made such that the stators are provided with axial through-holes, the armature coils are fixedly fitted into the through-holes, and both ends of the armature coils are made to project from both end faces of a stator, and are made to face the rotary field bodies fixed to the rotors on both sides of the stator.

If this configuration is adopted, it is unnecessary to attach armature coils on both end faces of a stator, respectively, and it is possible to enhance workability.

Further, the axial gap type motor of the invention is preferably configured such that the stators and the rotors are alternately stacked with the rotary shaft as a main shaft, the back yokes are disposed only on both ends in the axial direction, and the stators at both axial ends are detachably combined with the back yokes by screwing.

In this way, the back yokes are disposed only on both ends in the axial direction, and a back yoke is not provided in each stator. Accordingly, assembling becomes easy, stators and rotors can be disposed in high density, and high output can be obtained without increasing a size in the radial direction. Therefore, a motor can be made compact and lightweight.

Further, in the axial gap type motor in which the magnetic-flux directions are directed to the axial direction, the back yokes are disposed on both ends in the axial direction. Therefore, it is possible to shield a magnetic field penetrating a stator from leaking to the outside, and it is possible to strengthen a magnetic field to realize high output of torque.

Moreover, the stators and rotors alternately assembled along the rotary shaft finally are detachably connected to the back yokes fixed in advance to fixing members that fix the stators on both axial ends, so that assembling and disassembling can be performed easily.

In addition, any back yokes are not attached to the both axial ends, but the stators at both axial ends may be made thick, and the stators may be detachably attached to fixing members with screws, etc.

The rotors and stators alternately stacked with the rotary shaft as a main shaft, for example, are configured such that the rotary shaft passes through and is fixed to a central hole of each of the rotors, the stators disposed on both axial sides of the rotor are connected together with spacing therebetween by a connecting spacer, and the rotor is fitted into an air gap between both the stators.

When stators are connected together by the connecting spacer, specifically, it is preferable that each of the stators connected together via the connecting spacer is split into upper and lower stators in a position where the rotary shaft is sandwiched, the upper stators are connected together by an upper connecting spacer and are used as upper split members, the lower stators are connected together by a lower connecting spacer and are used as lower split members, and the rotors fixed to the rotary shaft are sandwiched and fitted between the upper and lower split members.

As mentioned above, if stators disposed on both sides of a rotor are sequentially connected together by a connecting spacer, it is possible to simply assemble a number of alternately stacked rotors and stators in a built-in manner while maintaining the gap between each rotor and each stator with precision, only by inserting rotors fixed at intervals to the rotary shaft between adjacent stators. Also, only by fixing the rotors at both axial ends to the back yokes by screwing, it is possible to fixedly arrange all the stators in predetermined positions, and it is possible to easily manufacture a series coupling synchronous motor.

Preferably, the connecting spacer includes: an outer frame disposed on the outer peripheral side of the stators, and connecting parts that are made to project with required spacing from the outer frame, and are connected to each of the stators.

In that case, the connecting spacer may be a U-shaped connecting spacer which connects every adjacent stators, or one comb tooth-shaped connecting spacer.

The connection between the connecting parts of the connecting spacer and the stators may be made by fixedly bonding them using an adhesive, or by fitting them in concave or convex fitting parts formed in the connecting parts and the stators.

Further, preferably, the connecting parts of the connecting spacer are fixed to the surfaces of the stators facing the rotors, openings are provided in portions where armature coils are disposed, and the thickness of the openings in the axial direction are dimensioned to the gap between rotary field bodies on the side of a rotor and armature coils on the side of a stator. If this configuration is configured, a required gap will be automatically obtained only by inserting a rotor between connecting parts.

Instead of the configuration in which stators are connected together in advance using the connecting spacer, and the stators pinches the rotors fixed to the rotary shaft from a direction perpendicular to the axis, a configuration in which stators and rotors are sequentially inserted through the rotary shaft may be adopted.

In that case, one of the back yokes is attached to one end of the rotary shaft, the rotary shaft is loosely fitted into and passes through central holes of the stators, the stators and the rotors are alternately assembled to the rotary shaft, the stators are positioned and held by positioning and fixing members disposed on the outer peripheral side, and the stator at the other end of the rotary shaft is attached to the other one of the back yokes.

According to the above configuration, assembling can be simply performed only by sequentially inserting the stators and the rotors into the rotary shaft, and during disassembling, the stators and rotors can be simply detached if only fixation between the back yokes and the stators at ends in the axial direction are released. As a result, assembling and disassembling can be performed easily.

Preferably, peripheral walls disposed with air gaps from the outer peripheral side of the rotors and the stators are provided between both the back yokes.

More specifically, if a lower peripheral wall is connected to one back yoke of the back yokes at both ends and an upper peripheral wall is connected to the other back yoke, all the rotors and stators are completely surrounded by the upper and lower peripheral walls in a state where the stators at both axial ends are fixed to the back yokes. As a result, it is possible to surely prevent leakage of magnetic fluxes to the outside.

Irregularities may be provided in inner surfaces of the peripheral walls so as to serve as the positioning and fixing member of the aforementioned stators.

For example, if the inner surface of the lower peripheral wall connected with the back yoke at one end is provided with concave and convex parts, it is possible to position and hold stators when lower ends of the stators sequentially inserted into the rotary shaft are fitted into concave parts of the concave and convex parts.

In addition, although the invention can be used suitably for a series coupling synchronous type in which rotors and stators are alternately stacked, it is needless to say that the invention is also used suitably for an axial gap type motor that is configured such that a pair of stators are disposed on both axial sides of one rotor.

Preferably, the plurality of rotary field bodies and/or armature coils disposed at intervals in the peripheral direction in the rotors and/or stators are received within a container with required spacing therebetween, and the container is detachably attached to the rotors and/or stators.

If this configuration is adopted, when maintenance of any rotary field bodies or armature coils is required, a container is detached from a stator or rotor and the rotary field bodies or armature coils within the container are replaced, so that maintenance can be simply performed compared with a case where armature coils or rotary field bodies are fixed to stators or rotors.

At that time, in the case where the stators are split into upper and lower stators as mentioned above, the container also includes a pair of upper and lower semi-annular containers, which are attached to the upper and lower stators, respectively. Moreover, the rotors are also split into upper and lower rotors, and the rotary field bodies attached to the rotors are also received in the upper and lower semi-annular containers, and are detachably attached to the rotors.

In a case where the rotary field bodies and/or the armature coils received within the containers are made of a superconductive material, the containers are heat-insulating containers, and refrigerant is filled into the containers.

The container is composed of a body and a lid made of a magnetically permeable material, such as resin, and the lid are made transparent, so that armature coils or rotary field bodies encapsulated inside the container can be taken out of or taken into the container.

Effects of the Invention

As apparent from the above description, according to the invention, the armature coils have an empty core, or a core member composed of a flux collector. Therefore, the armature coils disposed in the stators and the rotary field bodies disposed in the rotors can be arrange close to each other, high output can be obtained, and miniaturization of the motor can be achieved.

Particularly if the rotary field bodies and/or the armature coils are formed from a superconductive material, high output can be achieved while further miniaturization can be attained.

Further, if the stators and the rotors are alternately disposed with the rotary shaft as a main shaft, and the stators at both axial ends are fixed to the back yokes, the stators and the rotors can be disposed in high density, leakage of a magnetic field the magnetic-flux directions of which is the axial direction to the outside can be shielded, and the magnetic field can be strengthened, thereby realizing high output of torque. Moreover, the stators and the rotors can also be simply disassembled by removing the stators at both axial ends from the back yokes.

Further, if stators are connected together with predetermined spacing by a connecting spacer, and rotors are inserted into air gaps between the stators, the gap between a rotor and a stator can be specified to a predetermined dimension with precision, and a number of rotors and stators can be assembled simply.

As such, from the points that high output can be obtained while miniaturization can be achieved, assembling or disassembling is easy, and maintainability is excellent, a series coupling synchronous motor optimal as a motor for propulsion of large ships, such as government and public office ships or passenger ships.

REFERENCE NUMERALS

10: AXIAL GAP TYPE SUPERCONDUCTING MOTOR
11: ROTOR
12, 13: STATOR
14: UPPER CONNECTING SPACER
15: LOWER CONNECTING SPACER
16, 17: BACK YOKE
19: SCREW
20: ROTOR YOKE
22: PERMANENT MAGNET
24, 25: ARMATURE COIL
30: ROTARY SHAFT
100: FIELD COIL MADE OF SUPERCONDUCTIVE MATERIAL
102: FLUX COLLECTOR

BEST MODE FOR CARRYING OUT THE INVENTION

Embodiments of the invention will be described with reference to the drawings.

Figure 1:
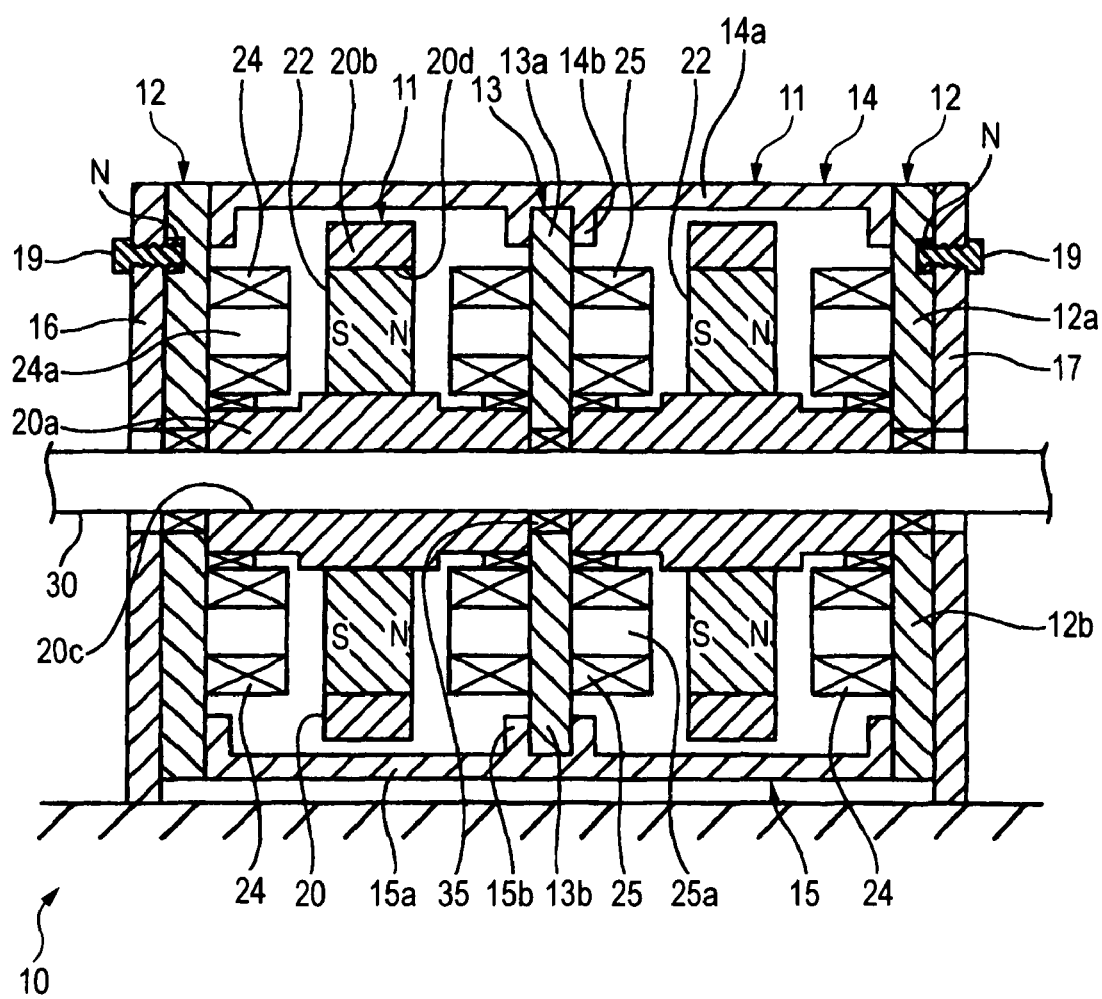
FIG. 1 a sectional view showing a motor of a first embodiment of the invention.
Figure 2:
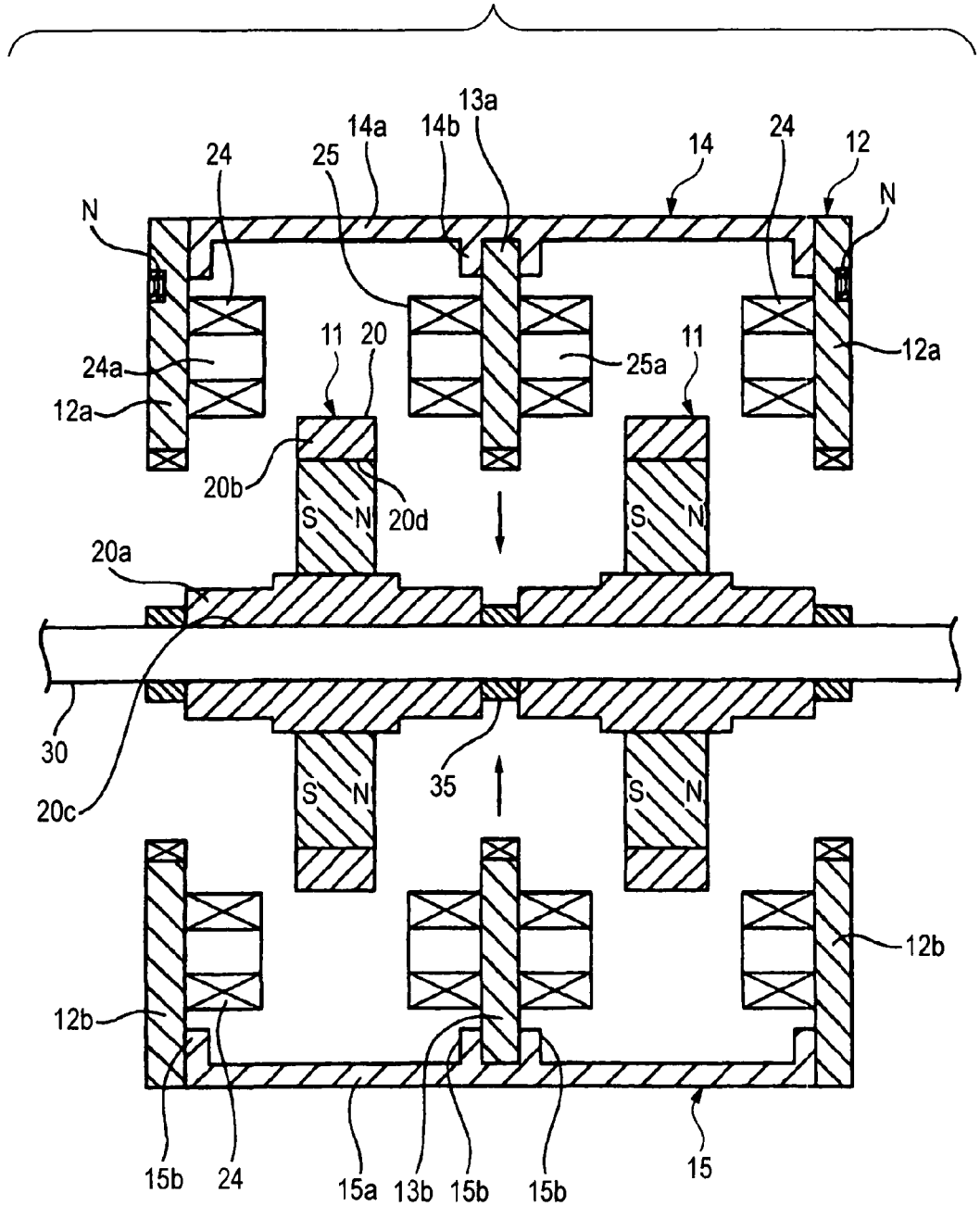
FIG. 2 is a sectional view showing an assembling method of the first embodiment.
Figure 3:
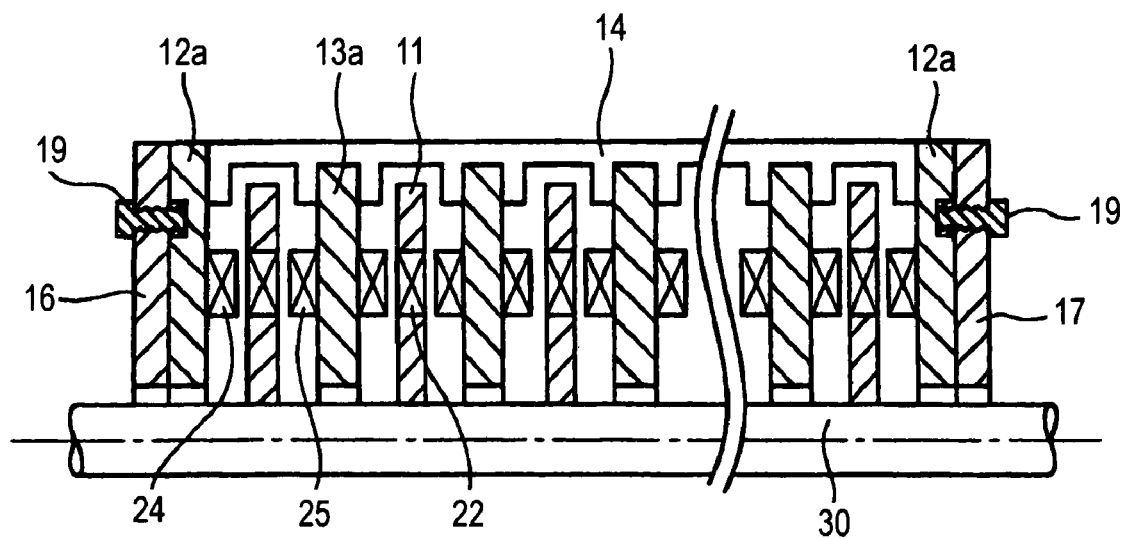
FIG. 3 is a schematic view of the first embodiment.

FIGS. 1 to 3 show a series coupling synchronous axial gap type motor 10 of a first embodiment of the invention. In addition, FIGS. 1 and 2 show a configuration in which two rotors 11, stators 12 at both axial ends, and an intermediate stator 13 are alternately disposed in the axial direction of a rotary shaft 30 in order to simplify illustration. However, as shown in FIG. 3, a number of intermediate stators 13 are provided, and rotors 11 are disposed between adjacent stators 12 and 13 and between adjacent stators 13 and 13, respectively.

A rotor 11 is fixed to the rotary shaft 30, and stators 13 and 12 are disposed with required air gaps on both sides of the rotor 11 in its axial direction. The stators 12 and 13 are connected to each other by upper and lower connecting spacers 14 and 15, and the stators 12 at both axial ends are fixed to back yokes 16 and 17 with screws 19.

The rotor 11 has a disk-like rotor part 20b which is made to project in the vertical direction in the drawing from the center of a bearing 20a of a rotor yoke 20, and has a configuration in which the rotary shaft 30 passes through and is fixed in a through-hole 20c bored in an axial center of the bearing 20a, and the rotor 11 and the rotary shaft 30 are made to rotate together.

Attachment holes 20d are provided in the rotor part 20b at intervals in the peripheral direction around the axis, and permanent magnets 22 are fitted into and fixedly attached to the attachment holes 20d, respectively, and are disposed such that the directions of magnetic fluxes thereof become the axial direction. Both end faces of the permanent magnets 22 are attached so as to be flush with both end faces of the rotor part 20b so that the permanent magnets 22 may not project from the rotor part 20b.

The rotary shaft 30 are made to sequentially pass through through-holes 20d formed in the axial centers of bearings 20a of rotor yokes 20 of a plurality of rotors 11, and the plurality of rotors 11 are fixed at predetermined intervals in the axial direction of the rotary shaft 30. Further, a rotary bearing 35 is fitted on the rotary shaft 30 between adjacent rotors 11, and openings of the stators 12 and 13 fit in the position of the rotary bearing 35.

The stators 12 at both axial ends are formed in a symmetrical shape, and the intermediate stators 13 (although one stator is shown in FIG. 1, a number of stators are shown in FIG. 3) have the same shape. The stators 12 and 13 are formed in a disk shape, and as shown in FIG. 2, are split into upper and lower pieces, respectively, so as to provide semi-disk-like upper stators 12a and 13a and semi-disk-like lower stators 12b and 13b. A plurality of armature coils 24 and 25 made of a normal conductive material are fixed to rotor-facing surfaces of the upper and lower stators 12a~13b at intervals in the peripheral direction around the axis, and are made to project in the axial direction.

The armature coils 24 are fixed only to a surface of each of the stators 12 at both axial ends, which faces the rotor 11, while the armature coils 25 are fixed to both surfaces of the intermediate stator 13.

Although the armature coils 24 and 25 are fixed to the stators 12 and 13 with an adhesive, one end of each of the coils may be fixedly press-fitted into a groove formed in an end face of a stator.

The armature coils 24 and 25 form empty cores 24a and 25a in a hollow part of each of which an iron core is not provided, and have no configuration in which a coil is wound around an iron core.

The permanent magnets 22 and the armature coils 24 and 25 are disposed and located such that they face each other on the same axis, and the spacing, i.e., air gap distance L between the permanent magnets 22 and the armature coils 24 or 25 is set to 0.1 mm to 1 mm. In this embodiment, the air gap distance is set to 0.5 mm.

In addition, required electric power is supplied to the armature coils 24 and 25 from a power source (not shown).

The upper stators 12a and 13a and the lower stators 12b and 13b which are disposed with air gaps from the both end faces of the rotor parts 20b are connected together via the upper connecting spacer 14 and the lower connecting spacer 15, respectively.

The above upper connecting spacer 14 and the lower connecting spacer 15 are formed in a comb tooth shape in which connecting parts 14b and 15b are provided so as to project with predetermined spacing therebetween from outer frames 14a and 15a. The connecting parts 14b of the upper connecting spacer 14 are screwed and fixed to the upper stators 12a and 13a, and the connecting parts 15b of the lower connecting spacer 15 are screwed and fixed to the lower stators 12b and 13b.

While screw holes are provided in the back surfaces (surfaces opposite to projecting parts of the armature coils) of the stators 12 (upper stators 12a or lower stators 12b) at both axial ends, and nuts N are buried in the screw holes, screw holes 16a and 17a are provided in the back yokes 16 and 17, screws 19 are inserted into the screw holes, respectively, and screwed into and fixed to the nuts N.

The above back yokes 16 and 17 are formed from a non-magnetic material.

As for assembling of the axial gap type motor 10 having the above configuration, the rotary shaft 14 passes through and is fixed to the rotor yokes 20 to which the permanent magnets 22 are attached.

Meanwhile, the armature coils 24 and 25 are attached to the stators 12 and 13, the upper stators 12a and 13a are connected together by the upper connecting spacer 14, and the lower stators 12b and 13b are connected together by the lower connecting spacer 15.

In this state, the lower stators 12b and 13b connected together by the lower connecting spacer 15 are capped on the rotors 11 fixed to the rotary shaft 30 from below, and the rotors 11 are inserted into a gap between the lower stators 12b and 13b and into a gap between the lower stators 13b and 13b. Openings provided in upper end faces of the stators 12b and 13b abut on and are stopped by outer peripheral surfaces of the rotary bearings 35, and the lower stators and the rotors 11 are positioned and held with a required gap therebetween.

Subsequently, the upper stators 12a and 13a connected together by the upper connecting spacer 14 are similarly capped on upper half peripheral portions of the rotor parts 20b from above, and upper portions of the rotor parts 20a are inserted between the stators 12a and 13a and between the stators 13a and 13a. Openings of lower end faces of the stators 12a and 13a abut on and are stopped by outer peripheral surfaces of the rotary bearings 35, and the upper stators and the rotors 11 are positioned and held with a required gap therebetween.

Then, after one end of the rotary shaft 30 has passed through a through-hole provided in one back yoke 16, the other end of the rotary shaft 30 passes through a through-hole provided in the other back yoke 17.

The back yokes 16 and 17 and the stators 12 at both axial ends are connected and fixed to each other with the screws 19, thereby completing assembling.

As mentioned above, by assembling the upper stators 12a and 13a and lower stators 12b and 13b in advance with the upper and lower connecting spacers 14 and 16, and only by inserting the rotors 11 between the lower stators 12b and 13b and between upper stators 12a and 13b, a required air gap can be held, and the assembling can be performed simply with excellent workability. Also, the gap between rotors and stators can be held with high precision.

In the axial gap type motor 10 having the above configuration, the armature coils 24 and 25 of the stators 12 and 13 form empty cores in which an iron core projecting from the armature coils 24 and 25 towards the permanent magnets 22 is not provided. Thus, during assembling operation, permanent magnets and armature coils do not attract each other, and the stators 12 and 13 are connected, positioned and held in advance with a connecting spacer. Therefore, workability becomes very excellent.

Also, the air gap distance between the rotor 11 and stator 12 or 13 that face each other can be made small, the motor can be miniaturized, and output of the motor torque can be increased.

Figure 4:
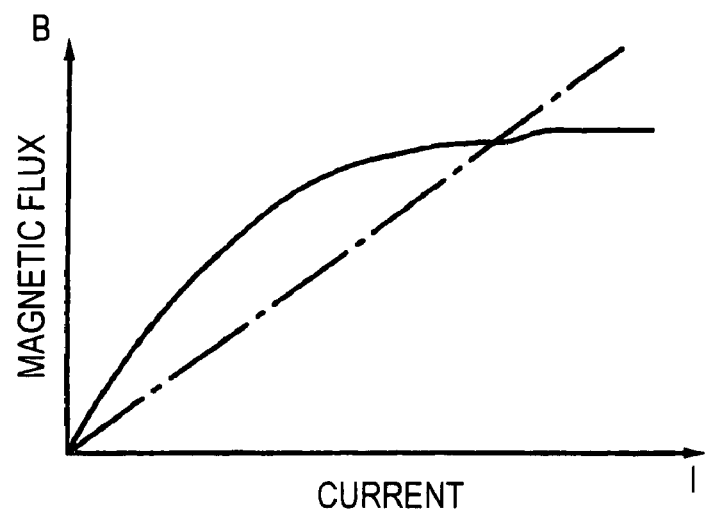
FIG. 4 is a graph showing the relationship between coil currents and magnetic fluxes.

It is generally known that a magnetic field when an iron core is disposed in a coil hollow part is strengthened. However, when an iron core is disposed, as shown in FIG. 4, an increase in magnetic flux almost disappears after excess of a certain fixed current value. As a result, a magnetic flux when there is no iron core tends to become strong. That is, the axial gap type motor 10 of the present embodiment can increase output of the motor torque when the upper limit of a current can be set high. Moreover, by omitting an iron core, the number of parts can be reduced, and the weight of the motor can also be made light.

Further, since the back yokes 16 and 17 are provided on the back side of the stators 12 at both axial ends to prevent generation of a leakage magnetic field, a magnetic field can be further strengthened and thereby high torque output can be realized. Moreover, since the back yokes 16 and 17 are detachably attached to the stators 12 by bolting, rotors and stators can be simply detached and disassembled during maintenance or the like.

Figure 5:
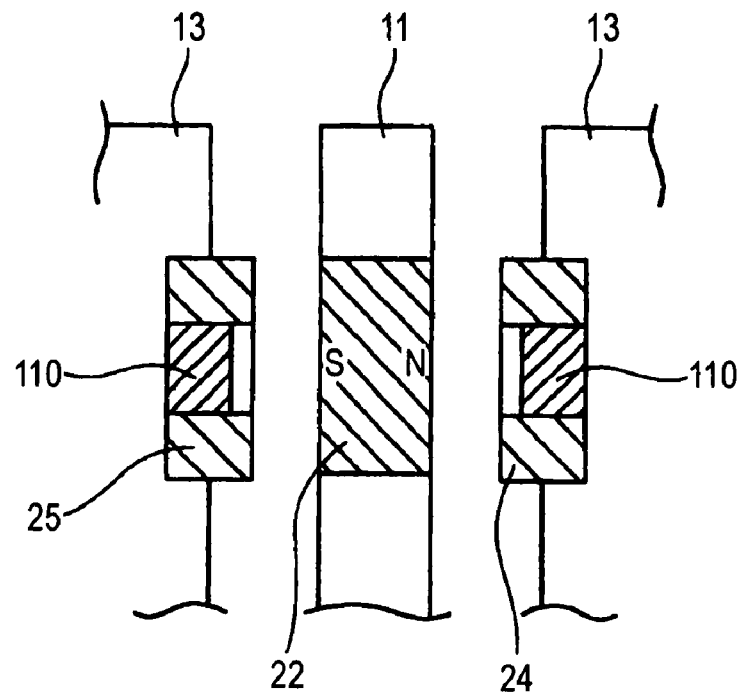
FIG. 5 is a schematic diagram showing a modification of the first embodiment.

FIG. 5 shows a modification of the first embodiment when the permanent magnets 22 are used as rotary field bodies, and flux collectors 110 are disposed in the armature coils 24 and 25 as core members. Tips of the flux collectors 110 are not made to project from tips of the armature coils 24 and 25, and do not attract the permanent magnets 22 to them.

Figure 6:
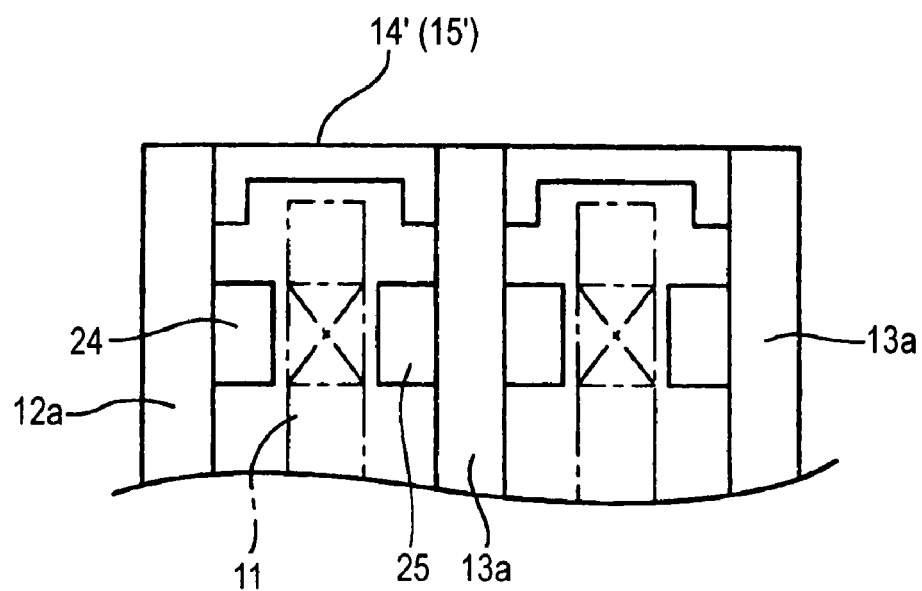
FIG. 6 is a view showing another modification of the first embodiment.

FIG. 6 also shows a modification of the first embodiment in which the shape of a connecting spacer 14' (15') is made different. The connecting spacer 14' is formed in a "U" shape, and connects adjacent stators 13 and 13 (12 and 13) to each other. By sequentially connecting adjacent stators with connecting spacers 14' in this way, stators corresponding to a difference can be used widely.

Figure 7:
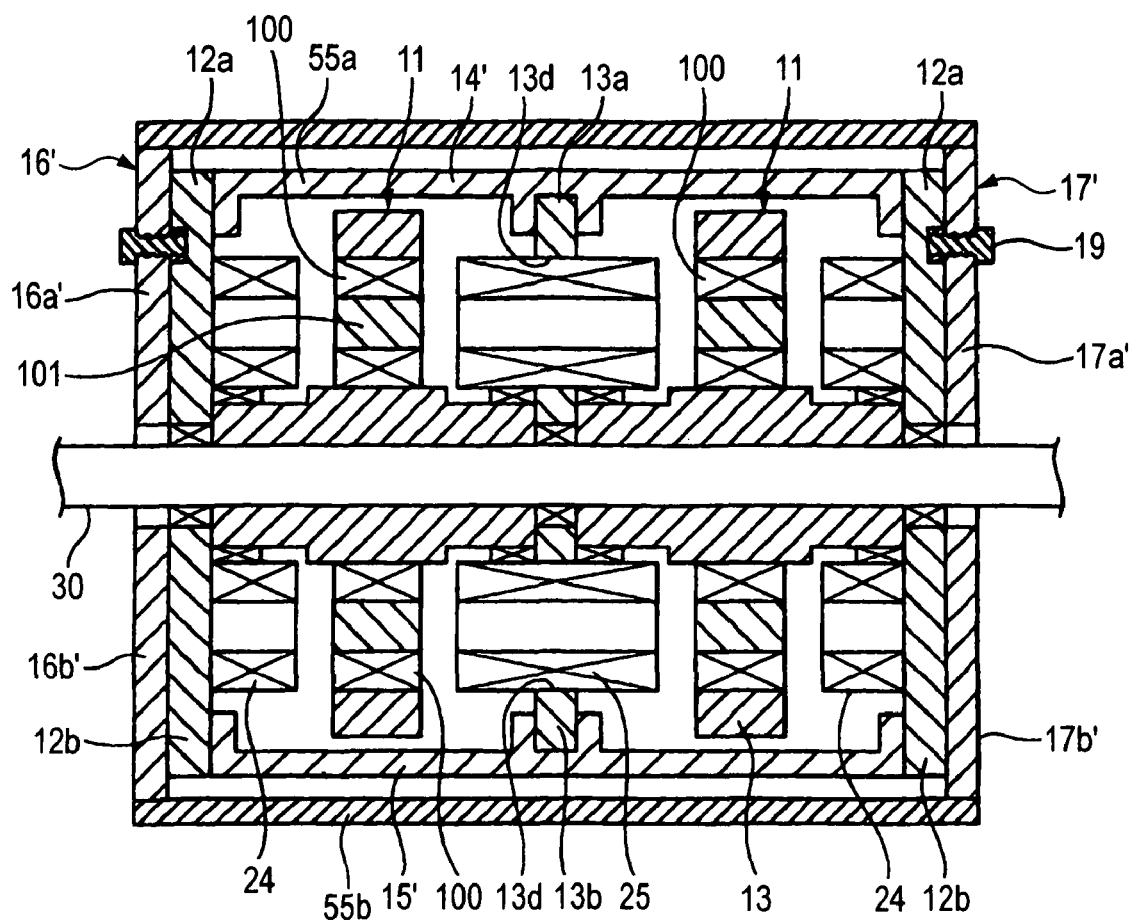
FIG. 7 is a sectional view showing a motor of a second embodiment.

FIG. 7 shows a second embodiment.

In the second embodiment, a through-hole 13d is provided in a stator 13 in an intermediate position to which armature coils 25 are attached, the armature coils 25 are fitted into and fixed to the through-hole 13d, and both ends of the armature coils are made to project from both end faces of the stator 13, and are made to face field coils 100 made of a superconductive material with a predetermined air gap therefrom.

The armature coils 25 and the stators 12 at both ends form empty cores, flux collectors 101 as core members are disposed in hollow parts of the field coils 100, and these flux collectors 101 are in almost the same positions as the tips of the field coils 100. In addition, the flux collectors may be made to project a little.

Further, back yokes 16' and 17' at right and left both ends are also split into upper and lower pieces, respectively, so as to provide upper back yokes 16a' and 17a' and lower back yokes 16b' and 17b'. The upper back yokes 16a' and 17a' at right and left both ends are connected together by a peripheral wall 55a having a semicircular arc-shaped cross section. Similarly, the lower back yokes 16b' and 17b' are connected together by a peripheral wall 55b having a semicircular arc-shaped cross section.

The second embodiment is similar to the first embodiment in that the rotors 11 are fixed to the rotary shaft 30 with spacing therebetween in the axial direction, and the stators 50 are split into upper and lower pieces and connected together with the upper and lower connecting spacers 14' and 15'.

In the second embodiment, while a plurality of rotors 11 and a plurality of stators 12 and 13 are alternately assembled like the first embodiment, the upper back yokes 16a' and 17a' connected together by the peripheral wall 55a are capped from above, the lower back yokes 16b' and 17b' connected together by the peripheral wall 55b are capped from below, and the back yokes 16' and 17' are fixed to the upper and lower stators 12a and 12b at both ends with the screws 19.

By adopting the above configuration, the armature coils 25 attached to both end faces of the stator 13 sandwiched between the rotors 11 can be constituted by one armature coil 25, and the number of parts can be reduced, and operation time and effort can be reduced.

Moreover, since the field coils made of a superconductive material are used as rotary field bodies fixed to the rotors 11, the problem of attraction caused in a case where permanent magnets are used when rotors and stators are alternately stacked and disposed can be solved. Therefore, since the armature coils and the rotary field bodies can be disposed close to each other, and flux collectors as core members are disposed in the rotary field bodies, output of the motor can be further increased.

Further, the rotors 11 and the stators 12 and 13 can be surrounded by a structure sealed by the back yokes and the peripheral walls, and leakage of magnetic fluxes to the outside can be surely prevented. Moreover, since the field coils are formed from a superconductive material, it is necessary to attach a cooling mechanism (not shown), but in this case, it is possible to achieve heat insulation by a sealed structure. Other operational effects are the same as those of the first embodiment.

Figure 8:
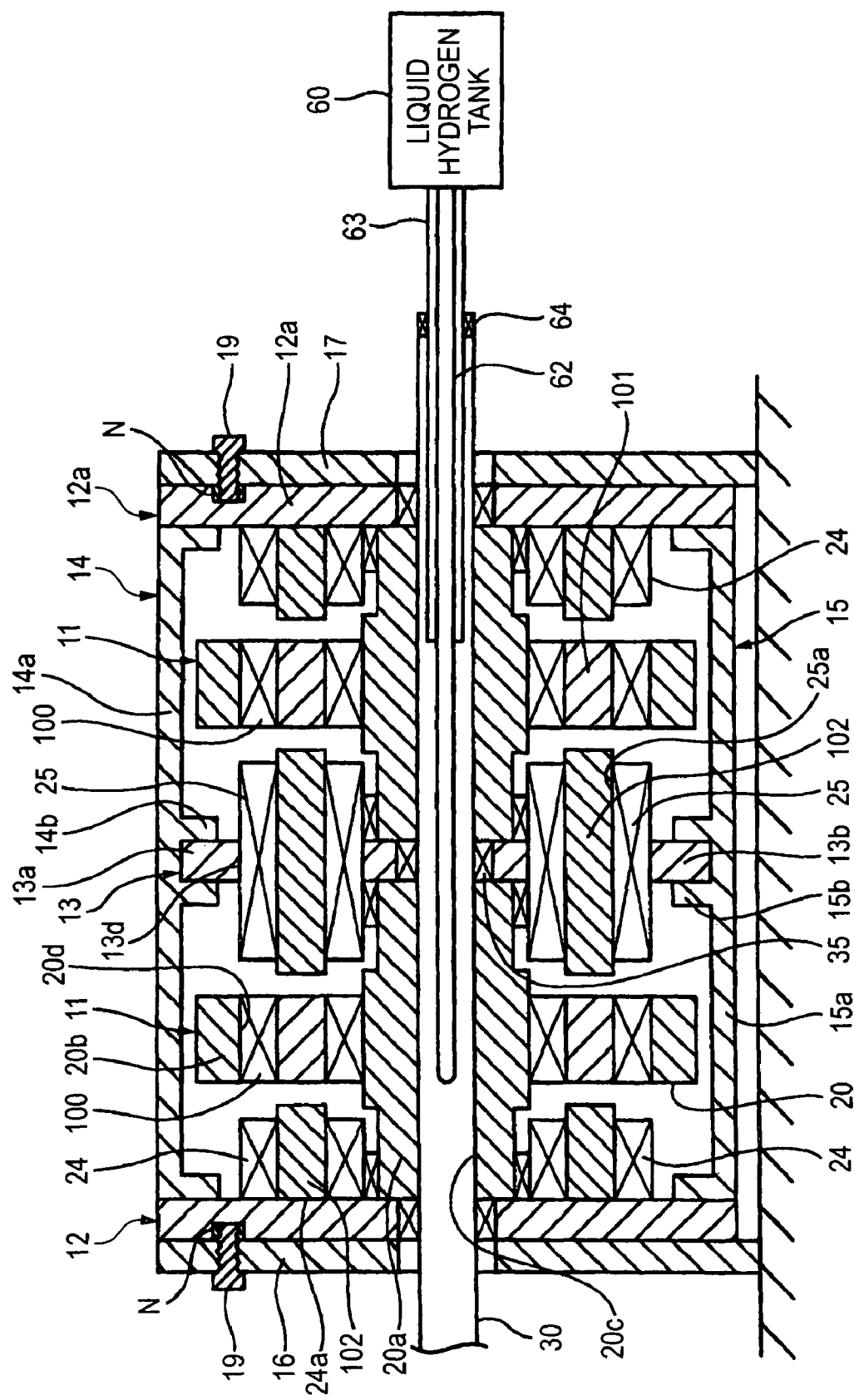
FIG. 8 is a sectional view showing a motor of a third embodiment.

FIG. 8 shows a third embodiment in which the field coils 100 made of a superconductive material like the second embodiment are attached to the rotors 11, and the flux collectors 101 are disposed in hollow parts of the field coils.

Meanwhile, flux collectors 102 are also disposed in hollow parts 24a and 25a of the armature coils 24 and 25 attached to the stators 12 and 13, and tips of the flux collectors 102 are made to project further slightly than the tips of the armature coils 24 and 25.

In the third embodiment, it is necessary to cool the field coils 100 made of a superconductive material to an ultra-low temperature. Thus, liquid hydrogen stored in a liquid hydrogen tank 60 is introduced into a hollow part 30a of the rotary shaft 30 to cool a bulk magnet 22'.

Specifically, the hollow part 30a opened towards one end in the axial direction is provided in the rotary shaft 30, and a pipe 63 having a refrigerant passage 62 is inserted into the hollow part 30a via a bearing 64 from the liquid hydrogen tank 60, and is terminated immediately before a position where a rotor is disposed. The pipe 63 is made into a double-tube structure, the refrigerant passage 62 which allows liquid hydrogen pass therethrough is provided in a central space, and liquid hydrogen is filled into the hollow part 30$a$ in the position where a rotor is disposed, thereby cooling the magnetic coils 100. Meanwhile, the outer peripheral space of the pipe 62 is made into a vacuum insulation space, and is vacuum-insulated except a position corresponding to the rotor 11.

According to the above configuration, like the first embodiment, the spacing between the stator 12 or 13 and the rotor 11 can be made small, thereby miniaturizing a motor, and since the magnetic coils are formed from a superconductor material, a magnetic field can be strengthened, thereby increasing the output of the motor.

In addition, since other components and operational effects are the same as those of the first embodiment, these components are denoted by the same reference numerals, and description thereof is omitted.

Further, the armature coils attached to the stators 12 and 13 may be made of a superconductive. In that case, a cooling passage is provided on the side of the stators.

Figure 9:
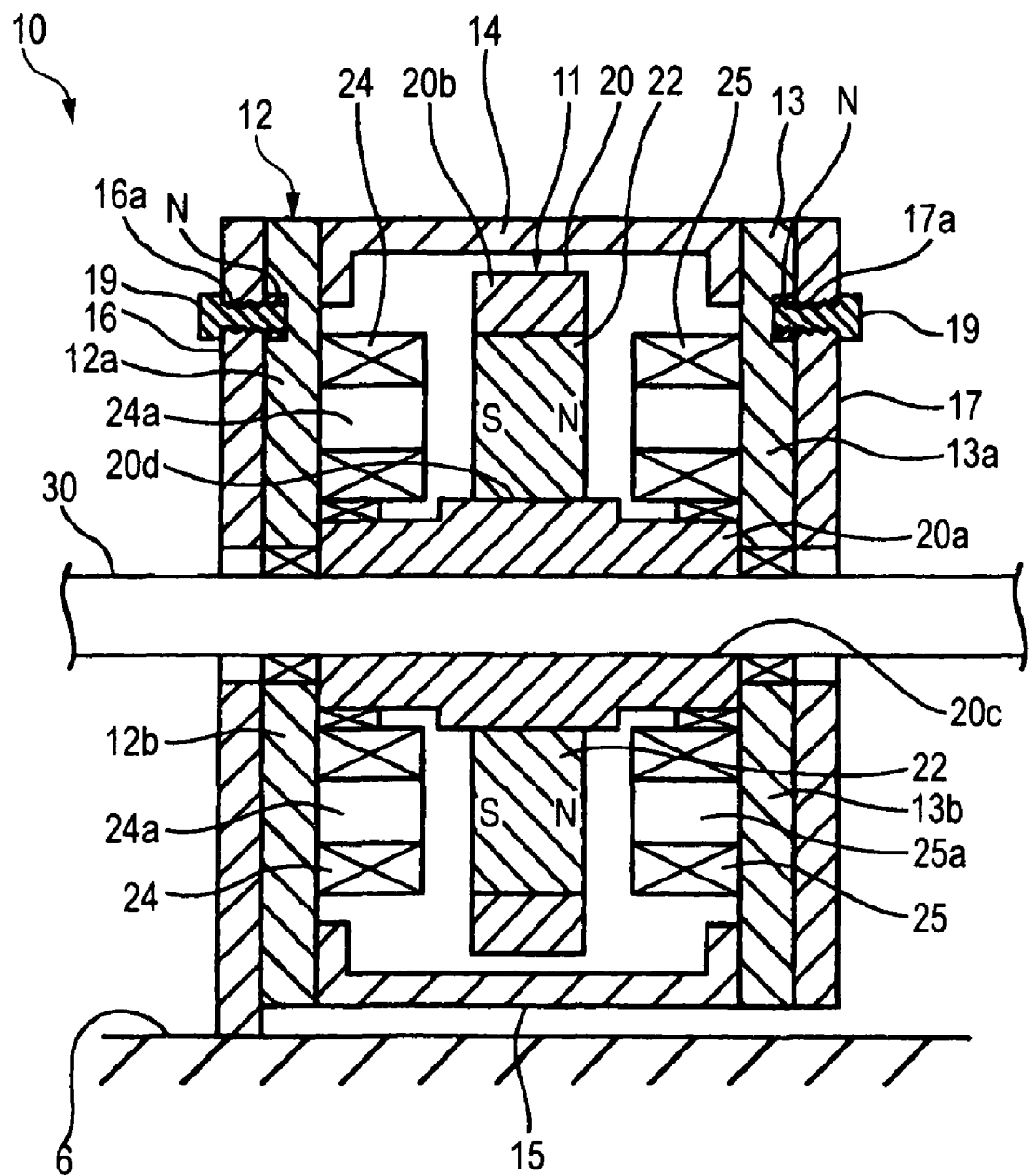
FIG. 9 is a sectional view showing another motor.
Figure 10:
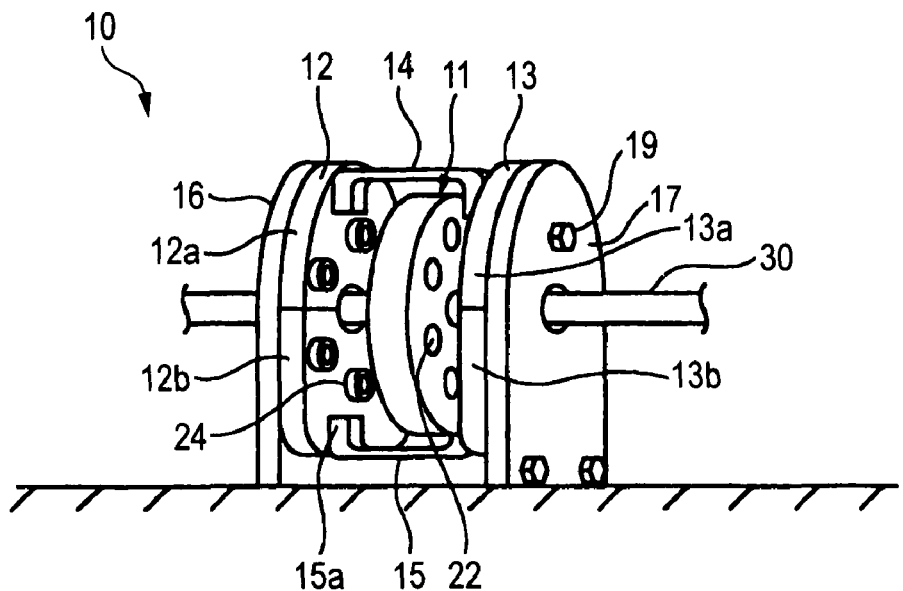
FIG. 10 is a perspective view of the motor of FIG. 9.

In addition, the configuration of the first embodiment can also be applied to an axial gap type motor having a configuration in which a pair of stators 12 is disposed on both sides of one rotor 11 in its axial direction, as shown in FIGS. 9 and 10, other than the series coupling synchronous axial gap type motor.

In addition, components shown FIGS. 9 and 10 are denoted by the same reference numerals as those FIGS. 1 to 3, and description thereof is omitted.

Figure 11:
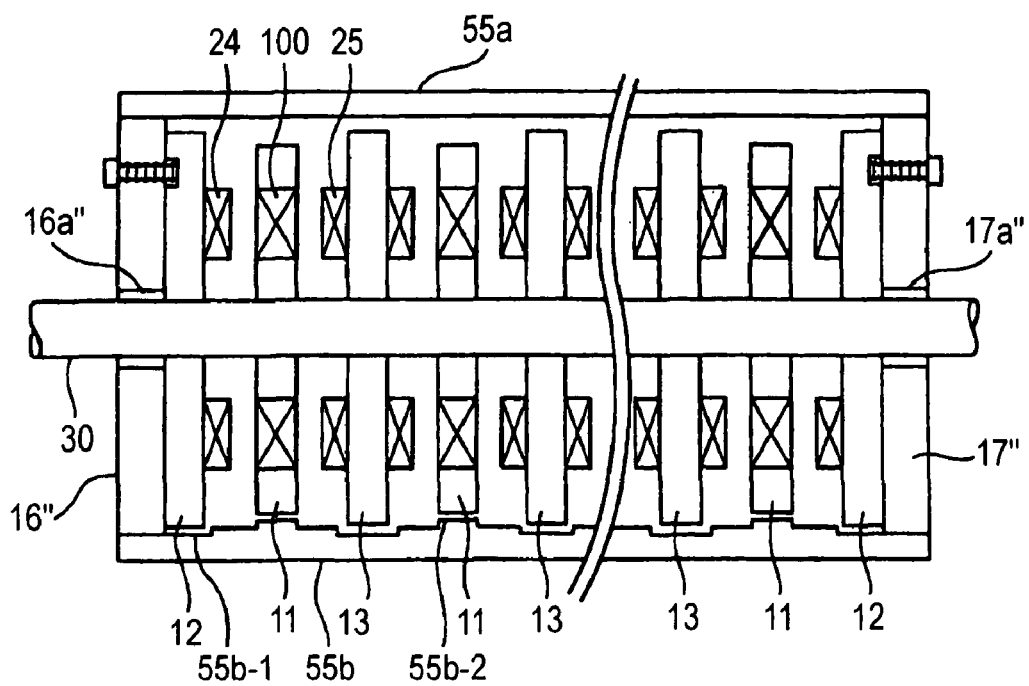
FIG. 11 is a schematic sectional view showing a motor of a fourth embodiment.
Figure 12:
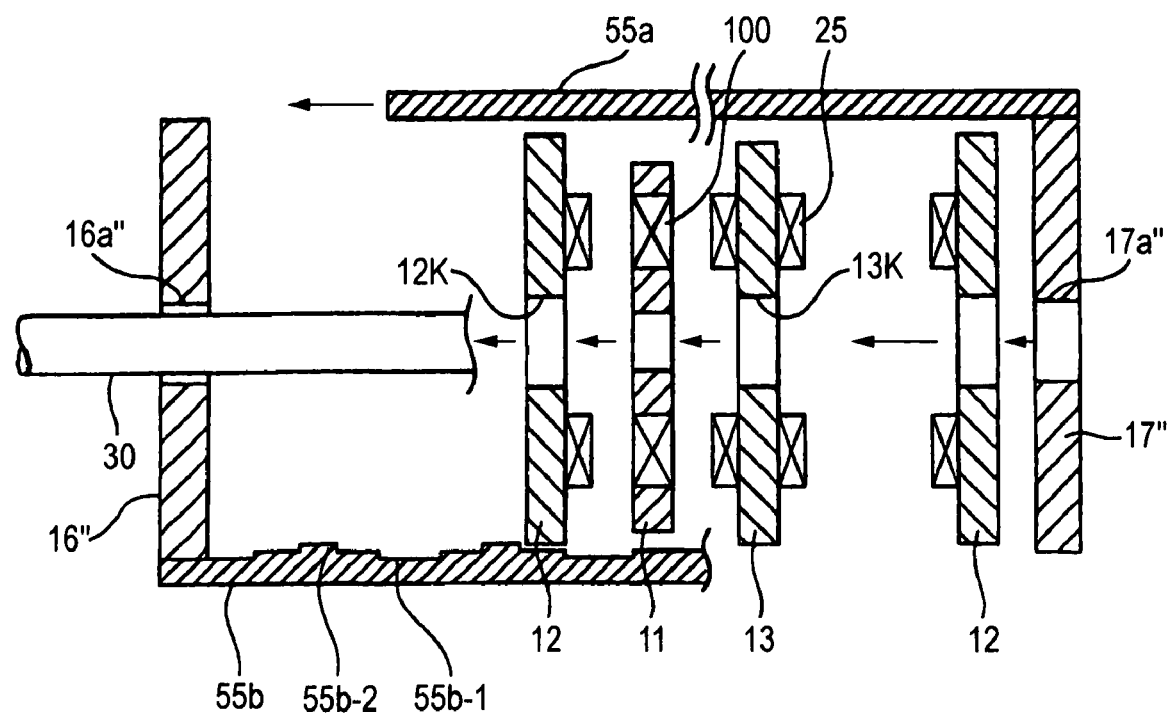
FIG. 12 is a sectional view showing an assembling method of the fourth embodiment.

FIGS. 11 and 12 show a fourth embodiment.

Although the configuration in which stators are connected together in advance using connecting spacers, and the stators sandwiches a rotor fixed to a rotary shaft from a direction perpendicular to the shaft are shown in the first to third embodiments, a configuration in which stator 12→rotor 11→stator 13 →rotor 11→stator . . . rotor 11→stator 12 are sequentially inserted and assembled through the rotary shaft 30 is shown in the fourth embodiment.

While a shaft hole 16$a''$ that is larger than the rotary shaft 30 is provided in one back yoke 16 disposed at one end in the axial direction, a circular shaft hole 17$a''$ into which the rotary shaft 30 fits is provided in the other back yoke 17''. Further, a lower peripheral wall 55$b$ is fixed to the one back yoke 16'', concave and convex parts are provided in an inner peripheral surface of the lower peripheral wall 55$b$, and lower ends of the stators 12 and 13 are fitted into concave parts 55$b$-1 so that they may also serve as positioning and fixing members. Further, convex parts 55$b$-2 serve as indicating portions for stop of the rotors 11. The upper peripheral wall 55$a$ is connected to the other back yoke 17''.

Except that the stators 12 at both axial ends and the intermediate stator 13 are not split into upper and lower pieces, the stators have the same shape as those of the second embodiment, and have the armature coils 24 and 25 having empty cores attached thereto. Central holes 12$k$ and 13$k$ into which the rotary shaft 30 fits loosely are provided in the centers of the stators.

Meanwhile, the rotors 11 are formed in the same shape as the first embodiment, and have the field coils 100 made of a superconductive material attached thereto.

In the fourth embodiment, first, the rotary shaft 30 is made to pass through the shaft hole 16$a''$ of the back yoke 16'' connecting the lower peripheral wall 55$b$. Next, a stator 12 at one end in the axial direction is made to move to a position where it is brought into contact with the back yoke 16'' through the rotary shaft 30. In this position, the lower end of the stator 12 fits into and is positioned in a concave part 55$b$-1 of the lower peripheral wall 55$b$. Next, a rotor 11 is stopped in the position of a convex part 55$b$-2 of the lower peripheral wall 55$b$ through the rotary shaft 30, and is positioned with a required air gap from the stator 12. In this position, the bearing 20$a$ of the rotor 11 and the rotary shaft 30 are fixed to each other by screwing, etc. Next, a stator 13 is made to pass through the rotary shaft 30. Then, similarly to the above, the lower end of the stator 13 is press-fitted into and stopped by a concave part 55$b$-1, and then, a rotor 11 is made to pass through the rotary shaft 30. By repeating this, all the stators 13 and rotors 11 are sequentially assembled to the rotary shaft 30. After the stator 12 at the other end in the axial direction is attached to the rotary shaft 30, the other back yoke 17'' is made to pass through the rotary shaft 30. In this state, the upper peripheral wall 55$a$ connected with the back yoke 17'' is joined to the lower peripheral wall 55$b$, and is also joined to the outer peripheral surface of the back yoke 16'', thereby surrounding the rotors 11 and the stators 12 and 13 in a sealed space. Finally, the screws 19 are inserted into the stators 12 and 12 from the back yokes 16'' and 17'', thereby fixedly connecting them.

According to the above configuration, assembling can be simply performed only by sequentially inserting the stators and the rotors into the rotary shaft, and during disassembling, the stators and rotors can be simply detached if only fixation between the back yokes and the stators at ends in the axial direction are released. As a result, assembling and disassembling can be performed easily, and maintainability can be enhanced. Moreover, rotors and stators can be disposed in high density with narrow gaps on a rotary shaft, and high output can be obtained.

Figure 13:
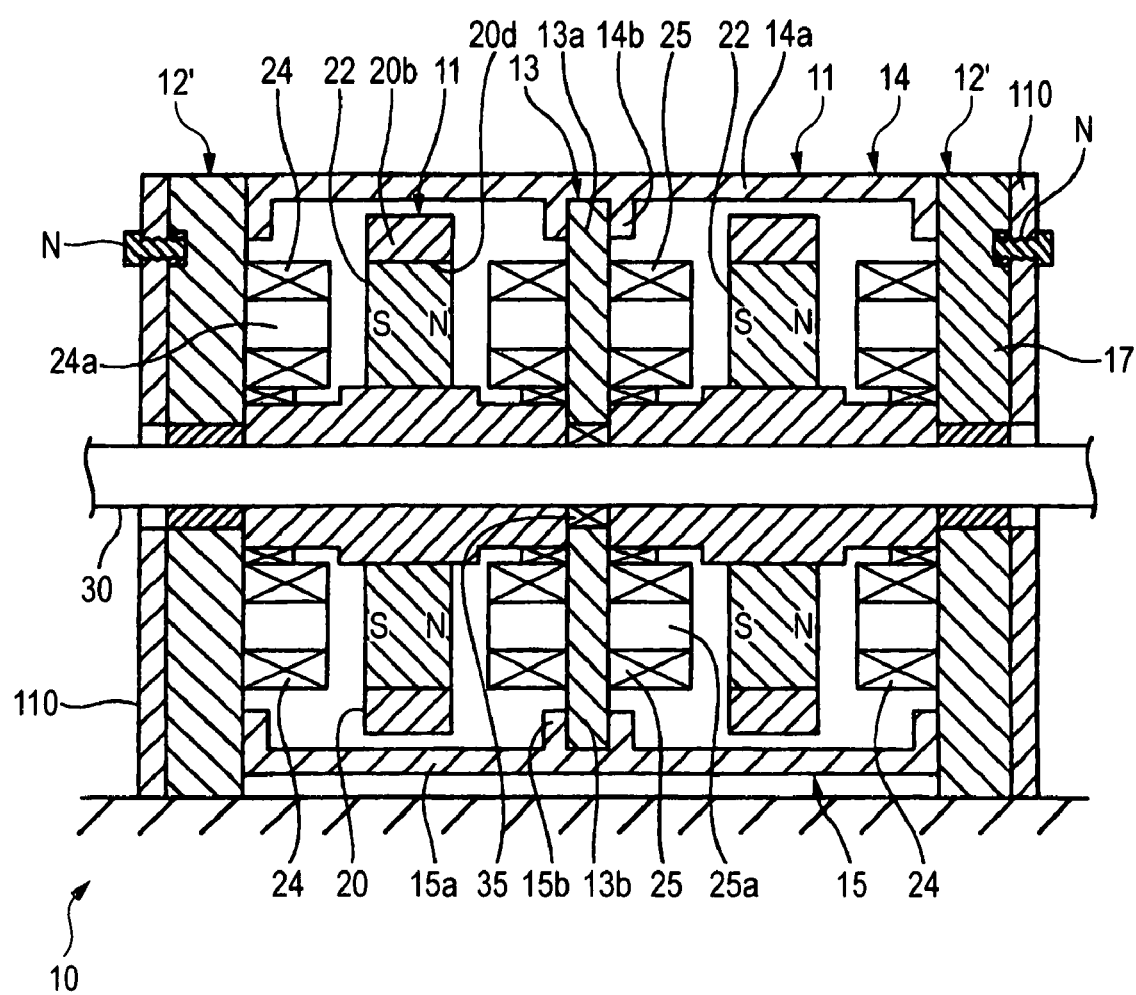
FIG. 13 is a sectional view showing a motor of a fifth embodiment.

FIG. 13 shows a fifth embodiment. This fifth embodiment has a thick-walled structure in which back yokes at both axial ends are eliminated, and stators 12' at both axial ends are made of a non-magnetic material. The stators 12' are detachably screwed and fixed to fixing members 110 with screws N. Since other components are the same as those of the first embodiment, they are denoted by the same reference numerals, and description thereof is omitted.

Figure 14:
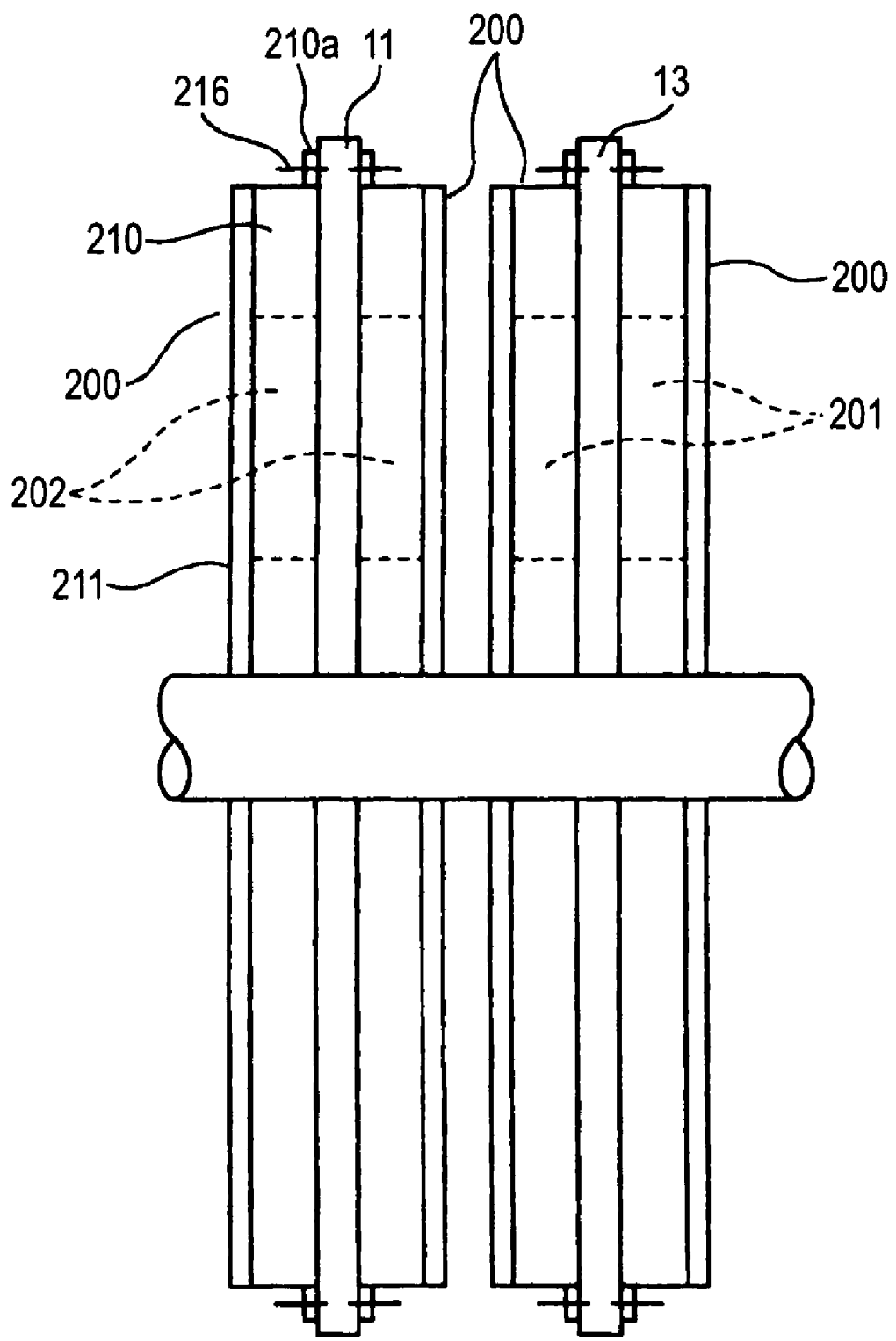
FIG. 14 is a schematic sectional view showing a sixth embodiment.
Figure 15:
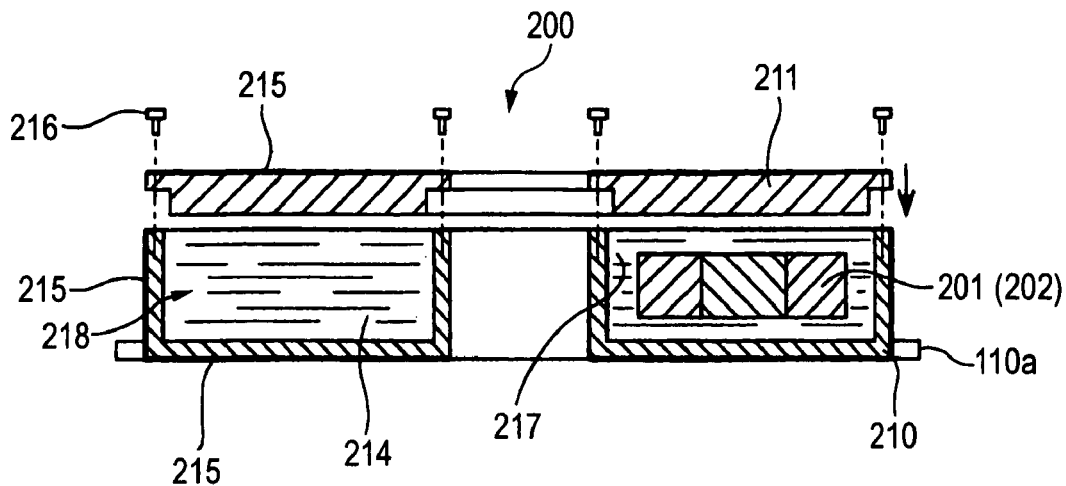
FIGS. 15A and 15B are sectional views showing a container of a sixth embodiment.
Figure 15:
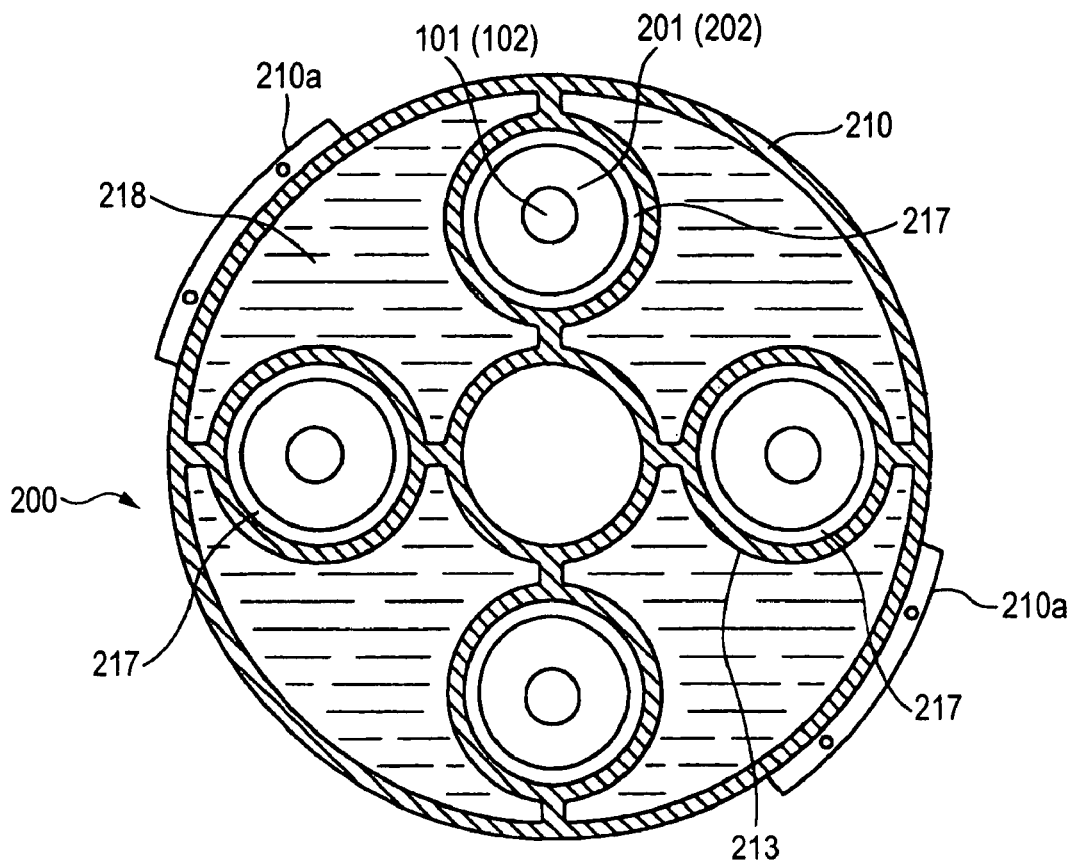

In all the aforementioned embodiments, the armature coils are directly fixed to the stators, and the rotary field bodies are directly fixed to the rotors. However, instead of directly fixing the armature coils or rotary field bodies to the stators or rotors in this way, like a sixth embodiment shown in FIGS. 14 and 15, and a seventh embodiment shown in FIG. 16, it is preferable in maintenance that an armature coil 201 made of a superconductive material, and a field coil 202 as a rotary field body are received in advance in containers 200, respectively, and the containers 200 are detachably attached to the stator 12 (13) and the rotor 11.

As shown in FIGS. 15A and 15B, the containers 200 are resin-molded articles having magnetic permeability, and are composed of an annular tubular container body 210 having an opening at its one end, and a lid body 211 which closes the opening of the container body 210. The interior of each container sealed in a vacuum state by the container body 210 and the lid body 211 is partitioned into coil receiving parts 217 and refrigerant filling parts 218 by partition walls 213, and the armature coil 201 or field coil 202 is received in each of the coil receiving parts 217. Each of the refrigerant filling parts 218 is filled up with a refrigerant 214 made of liquid nitrogen. A permeable heat insulator 215 is attached to the external surfaces of the container body 210 and lid body 211, thereby forming a heat-insulating container.

Further, an attaching flange 219a protrudes from the container body 210 such that this flange 210 is fixed to a stator or a rotor with screws 216.

The container 200 is detachably fitted in fitting parts that are recessed in both faces of a rotor of the first to four embodiments or in both end faces of a stator of the fourth embodiment, and is fixed thereto with the screws 216.

Figure 16:
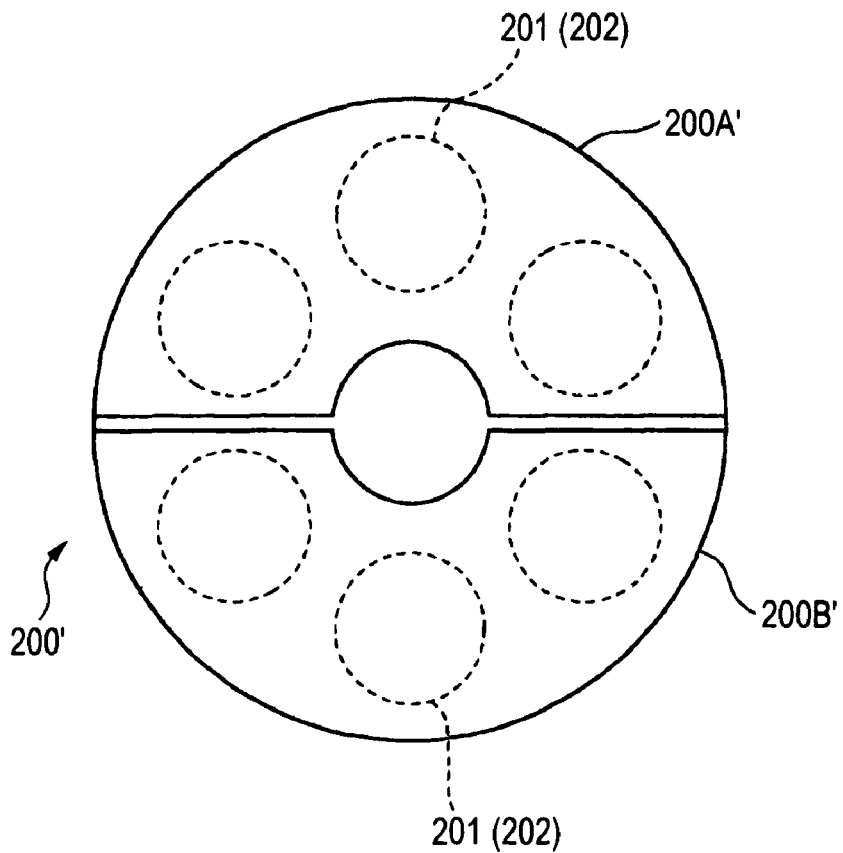
FIGS. 16A and 16B are views showing a container of a seventh embodiment.
Figure 16:
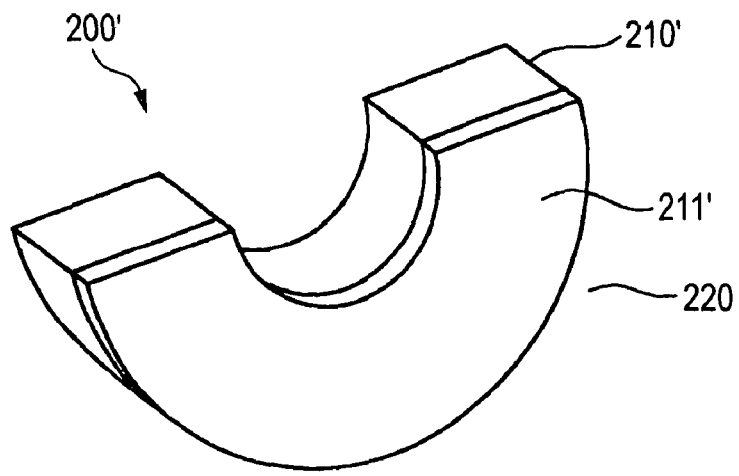

The seventh embodiment shown in FIG. 16 is a case where a container 200' is attached to a stator which is split into upper and lower pieces of the first to third embodiments. In this case, the container 200' is composed of a pair of upper and lower semi-annular containers 200A and 200B. Since other components are the same as those of FIGS. 14 and 15, they are denoted by the same reference numerals, and description thereof is omitted.

As such, if a configuration in which armature coils and rotary field bodies are not directly fixed to stators and rotors, but they are collectively and detachably encapsulated in containers is adopted, maintenance becomes easy, and the armature coils and field coils, made of a superconductive material, can be simply cooled.

INDUSTRIAL APPLICABILITY

The axial gap type motor of the invention is suitably used as power sources, such as large ships or vehicles which require high output. Moreover, the invention can also be suitably used for various industrial purposes, such as power generation equipment.

The invention claimed is:

1. A series coupling synchronous axial gap type motor, comprising:
   a rotary shaft as a main shaft, and
   rotors and stators alternately stacked with required air gaps in the axial direction of the rotary shaft, wherein
   the rotors are fixed to the rotary shaft,
   the stators are disposed not to be interlocked with the rotary shaft,
   a plurality of rotary field bodies are attached to each of the rotor around the axis,
   a plurality of armature coils are made to face the rotary field bodies with an air gap therefrom and are attached to each of the stators around the axis such that their magnetic-flux directions are directed toward the axial direction,
   the armature coils have an empty core, or a core member composed of a magnetic body attached thereto,
   the air gap between the rotary field bodies and the armature coils is set to 0.1 mm to 1 mm; and wherein
   the stators are provided with axial through-holes,
   the armature coils are fixedly fitted into the through-holes, and
   both ends of the armature coils are made to project from both end faces of a stator, and are made to face the rotary field bodies fixed to the rotors on both sides of the stator.

2. The axial gap type motor according to claim 1, wherein the stators at both axial ends are detachably combined with a pair of back yokes by screwing.

3. The axial gap type motor according to claim 2, wherein one of the back yokes is attached to one end of the rotary shaft,
   the rotary shaft is loosely fitted into and passes through central holes of the stators,
   the stators and the rotors are alternately assembled to the rotary shaft,
   the stators are positioned and held by positioning and fixing members disposed on the outer peripheral side, and the stator at the other end of the rotary shaft is attached to the other one of the back yokes.

4. The axial gap type motor according to claim 2, wherein peripheral walls disposed with air gaps from the outer peripheral side of the rotors and the stators are provided between both the back yokes.

5. The axial gap type motor according to claim 4, wherein irregularities are provided in inner surfaces of the peripheral walls so as to serve as the positioning and fixing member.

6. The axial gap type motor according to claim 1, wherein magnetic field coils are used as the armature coils and/or the rotary field bodies and are formed from a superconductive material.

7. The axial gap type motor according to claim 1, wherein the rotary field bodies are formed from permanent magnets, and
   the armature coils attached to the stators have empty cores, or core members made of a magnetic substance are attached to the stators without projecting from tips of the armature coils.

8. The axial gap type motor according to claim 1, wherein the rotary shaft passes through and is fixed to a central hole of each of the rotors,
   the stators disposed on both axial sides of the rotor are connected together with spacing therebetween by a connecting spacer, and
   the rotor is fitted into an air gap between both the stators.

9. The axial gap type motor according to claim 8, wherein each of the stators connected together via the connecting spacer is split into upper and lower stators in a position where the rotary shaft is sandwiched,
   the upper stators are connected together by an upper connecting spacer and are used as upper split members,
   the lower stators are connected together by a lower connecting spacer and are used as lower split members, and
   the rotors fixed to the rotary shaft are sandwiched and fitted between the upper and lower split members.

10. The axial gap type motor according to claim 8, wherein the connecting spacer includes:
    an outer frame disposed on the outer peripheral side of the stators, and
    connecting parts that are made to project with required spacing from the outer frame, and are connected to each of the stators.

11. The axial gap type motor according to claim 1, wherein the plurality of rotary field bodies and/or armature coils disposed at intervals in the peripheral direction in the rotors and/or stators are received within a container with required spacing therebetween, and
    the container is detachably attached to the rotors and/or stators.

12. The axial gap type motor according to claim 11, wherein
    the container includes a pair of upper and lower semi-annular containers, which are independently and detachably attached to the rotors and/or stators.

13. The axial gap type motor according to claim 11, wherein
    the rotary field bodies and/or armature coils received within the containers are made of a superconductive material,
    the containers are heat-insulating containers, and
    refrigerant is filled into the containers.

* * * * *